(12) United States Patent
Ma et al.

(10) Patent No.: US 9,031,843 B2
(45) Date of Patent: May 12, 2015

(54) METHOD AND APPARATUS FOR ENABLING MULTIMODAL TAGS IN A COMMUNICATION DEVICE BY DISCARDING REDUNDANT INFORMATION IN THE TAGS TRAINING SIGNALS

(75) Inventors: Changxue Ma, Barrington, IL (US); Harry M. Bliss, Evanston, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1608 days.

(21) Appl. No.: 11/863,763

(22) Filed: Sep. 28, 2007

(65) Prior Publication Data

US 2009/0089059 A1  Apr. 2, 2009

(51) Int. Cl.
| | | |
|---|---|---|
| *G10L 15/00* | (2013.01) | |
| *G06F 3/048* | (2013.01) | |
| *G09G 5/00* | (2006.01) | |
| *G10L 15/24* | (2013.01) | |
| *G06F 3/0481* | (2013.01) | |
| *G10L 15/06* | (2013.01) | |
| *G06F 3/01* | (2006.01) | |
| *G10L 15/187* | (2013.01) | |
| *H04M 1/725* | (2006.01) | |

(52) U.S. Cl.
CPC .............. *G10L 15/24* (2013.01); *G06F 3/0481* (2013.01); *G06F 3/016* (2013.01); *G10L 15/187* (2013.01); *G10L 15/06* (2013.01); *H04M 1/72538* (2013.01); *H04M 1/72547* (2013.01); *H04M 2250/12* (2013.01); *H04M 2250/22* (2013.01); *H04M 2250/74* (2013.01)

(58) Field of Classification Search
CPC ...... G10L 15/187; G06F 3/0481; G06F 3/016
USPC ...................................... 704/254, 250; 726/5
See application file for complete search history.

(56) References Cited

U.S. PATENT DOCUMENTS

| | | | |
|---|---|---|---|
| 5,121,428 A * | 6/1992 | Uchiyama et al. | ............ 704/243 |
| 6,549,792 B1 | 4/2003 | Cannon et al. | |
| 6,998,966 B2 | 2/2006 | Pedersen et al. | |
| 7,027,840 B2 | 4/2006 | McKee et al. | |
| 7,138,979 B2 | 11/2006 | Robin et al. | |
| 7,298,930 B1 | 11/2007 | Erol et al. | |
| 7,529,669 B2 * | 5/2009 | Ravi et al. | ...................... 704/249 |
| 2002/0089413 A1 * | 7/2002 | Heger et al. | .................. 340/5.82 |
| 2003/0187944 A1 | 10/2003 | Johnson et al. | |
| 2004/0189720 A1 * | 9/2004 | Wilson et al. | ................. 345/863 |

(Continued)

OTHER PUBLICATIONS

Patricia Besson, "A Multimodal Pattern Recognition Framework for Speaker Detection," Thesis No. 3819, 2007, Chapter 2, Speaker Detection as a Multimodal Pattern Recognition Task, Ecole Polytechnique Federale De Lausanne, Lausanne, EPFL, 2007, Cover page, pp. 5-15.

Korpipaa, et al., "Customizing User interaction in Smart Phones" Pervasive Computing, IEEE CS and IEEE ComSoc, IEEE, 2006, pp. 82-90.

(Continued)

*Primary Examiner* — Farzad Kazeminezhad
(74) *Attorney, Agent, or Firm* — Shumaker & Sieffert, P.A.

(57) ABSTRACT

A method and apparatus for enabling multimodal tags in a communication device is disclosed. The method comprises receiving a first training signal and receiving a second training signal in conjunction with the first training signal. A multimodal tag is created by discarding redundant or non-discriminative information associated with each of the first and second training signals to represent a combination of the first training signal and the second training signal and a function is associated with the created multimodal tag.

21 Claims, 7 Drawing Sheets

(56) References Cited

U.S. PATENT DOCUMENTS

| | | | |
|---|---|---|---|
| 2005/0105782 A1* | 5/2005 | Abiko | 382/124 |
| 2005/0138391 A1* | 6/2005 | Mandalia et al. | 713/186 |
| 2005/0171774 A1* | 8/2005 | Applebaum et al. | 704/250 |
| 2006/0120609 A1 | 6/2006 | Ivanov et al. | |
| 2006/0164382 A1* | 7/2006 | Kulas et al. | 345/156 |
| 2006/0173560 A1 | 8/2006 | Widrow | |
| 2006/0256082 A1 | 11/2006 | Cho et al. | |

OTHER PUBLICATIONS

Mantyjarvi, et al., "Enabling Fast and Effortless Customisation in Accelerometer Based Gesture Interaction," MUM 2004, Oct. 27-29, 2004 College Park, Maryland, USA. ACM, 2004, pp. 25-31.

Patent Cooperation Treaty, "PCT Search Report and Written Opinion of the International Searching Authority" for International Application No. PCT/US2008/075750 (CML05316) Apr. 8, 2009, 11 pages.

\* cited by examiner

US 9,031,843 B2

METHOD AND APPARATUS FOR ENABLING MULTIMODAL TAGS IN A COMMUNICATION DEVICE BY DISCARDING REDUNDANT INFORMATION IN THE TAGS TRAINING SIGNALS

FIELD OF THE DISCLOSURE

The present disclosure relates generally to communication devices. Particularly, the disclosure relates to control of the operation of a communication device by enabling multimodal tags in the communication device.

BACKGROUND

With the widespread proliferation of applications such as games, organizers, user interface applications, and the like, for portable electronic devices, wireless communication devices, cellular handsets, and the like, and with the familiarity of using standard input devices such as keypad, joysticks, touch pads etc., providing input signals to such applications in an easy and convenient manner has become an important factor in product usability and enjoyment.

Portable communication devices, because of their small size, often suffer limitations in the manner in which the user navigates menus, enters data, or otherwise provides input to applications running thereon. To overcome such limitations voice tags are commonly used in communication devices. Voice tags use speech recognition to recognize a voice signal, where the voice signal is matched to a previously trained voice tag pattern and executes an associated function. Although the voice modality, as is used in voice tags is a natural way to control a communication device, there are other input modalities that are available. For example, some communication devices are equipped with an accelerometer for sensing motion, vibration, shock or tilt of the device. In another example, a communication device equipped with a camera can capture movement, gesture, or text. As more and more input modalities are being added to the communication devices each day, improved and more convenient means of providing input signals is envisaged.

Accordingly, there is a need for a method and apparatus for enabling multimodal tags in a communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
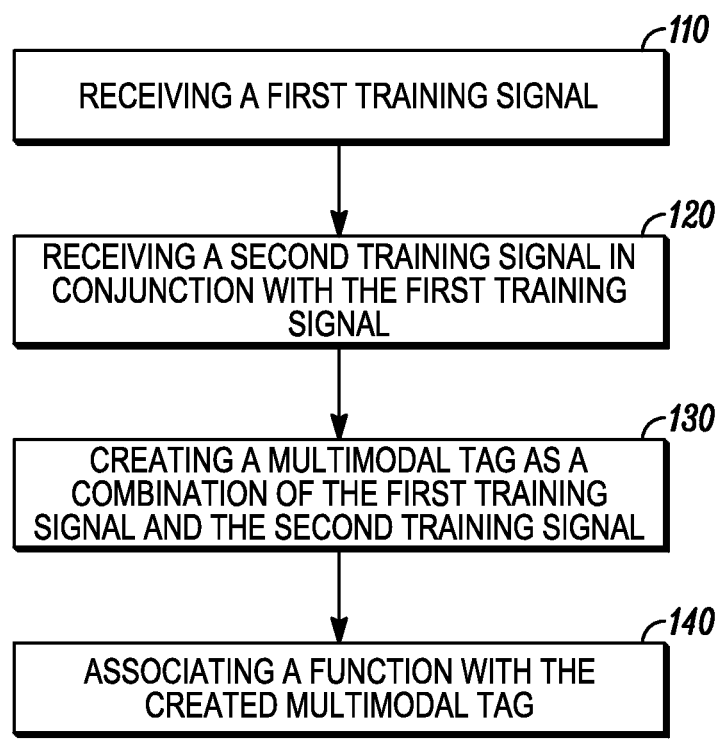
FIG. 1 is a flowchart illustrating a method for enabling multimodal tags in a communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments of the present invention provide a method and an apparatus for enabling multimodal tags in a communication device. A first training signal is received by the communication device. A second training signal is received in conjunction with the first training signal. A multimodal tag is created to represent a combination of the first training signal and the second training signal and a function is associated with the created multimodal tag.

Before describing in detail the method and apparatus for enabling multimodal tags in a communication device, it should be observed that the present invention resides primarily in combinations of method steps and system components related to a method and apparatus for enabling multimodal tags in a communication device. Accordingly, the method steps and apparatus components have been represented where appropriate by conventional symbols in the drawings, showing only those specific details that are pertinent to understanding the present invention so as not to obscure the disclosure with details that will be readily apparent to those of ordinary skill in the art having the benefit of the description herein.

FIG. 1 is a flowchart illustrating a method for enabling multimodal tags in a communication device. The communication device is trained to associate a function with user action(s). The user action involves providing a training signal using a mode of input. Examples of modes of input or input modalities are a microphone, an accelerometer, a touch pad, a key pad, a camera, joystick etc. Accordingly, at step 110, a first training signal is received by the communication device through a first input modality. At step 120, a second training signal is received in conjunction with the first training signal through a second input modality. The first training signal and the second training signal may each be one of an audio signal, a tactile based signal, a motion based signal, or a gesture based signal.

Figure 2:
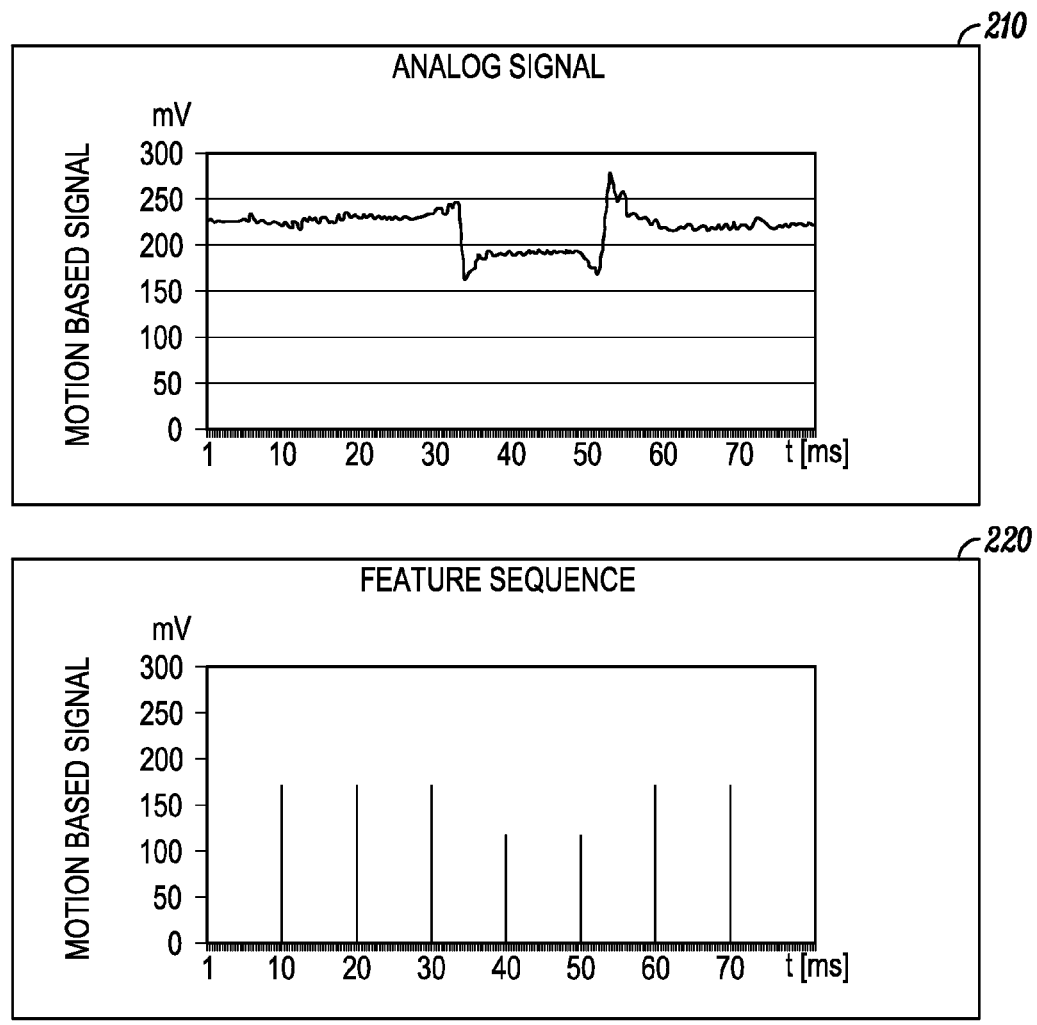
FIG. 2 is a trace of an analog signal generated by a motion sensor in accordance with some embodiments.
Figure 3:
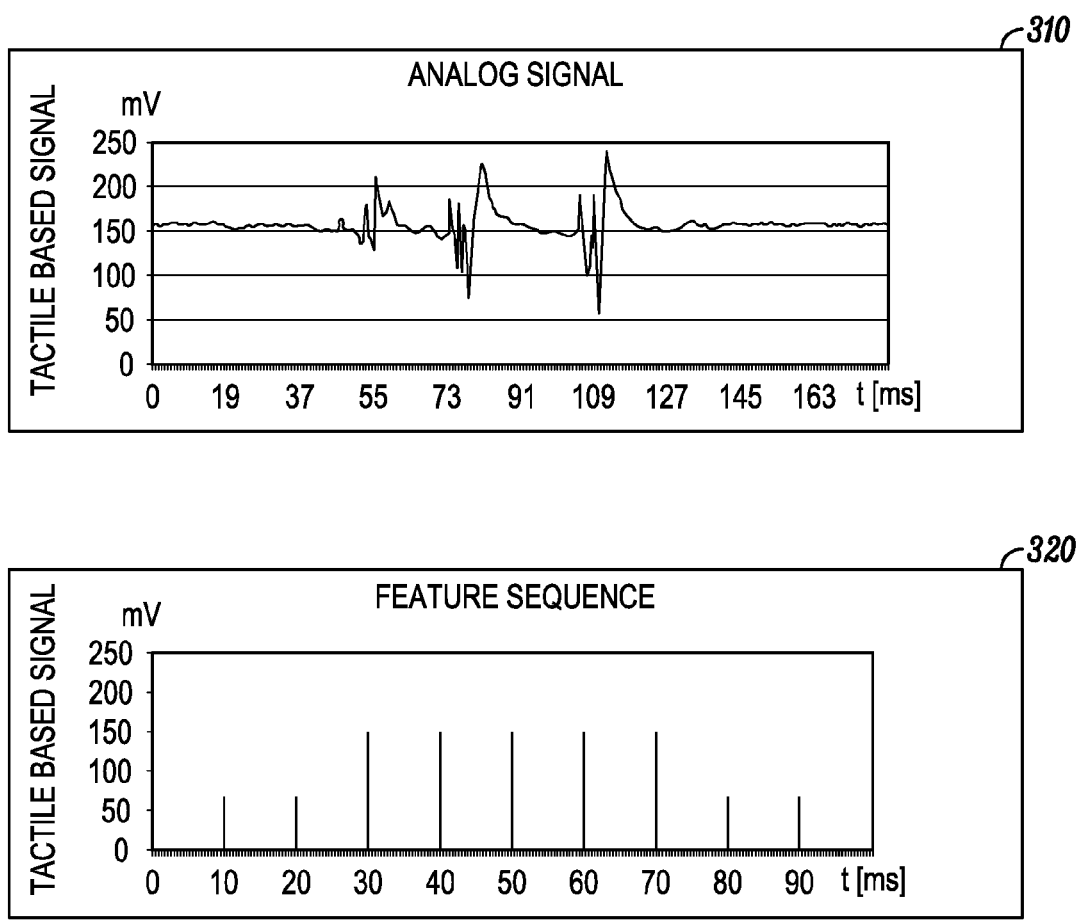
FIG. 3 is a trace of an analog signal generated by a tactile sensor in accordance with some embodiments.

At step 130, a multimodal tag is created to represent a combination of the first training signal and the second training signal. In one example, creating the multimodal tag is done by converting the first training signal (e.g. motion based signal 210) to a first feature sequence 220 as shown in FIG. 2 and converting the second training signal (e.g. tactile based signal 310) to a second feature sequence 320 as shown in FIG. 3. The first feature sequence and the second feature sequence are then registered as the multimodal tag. In an example, registering the first feature sequence and the second feature sequence as the multimodal tag means storing the combination of the first feature sequence and the second feature sequence as the multimodal tag.

Figure 4:
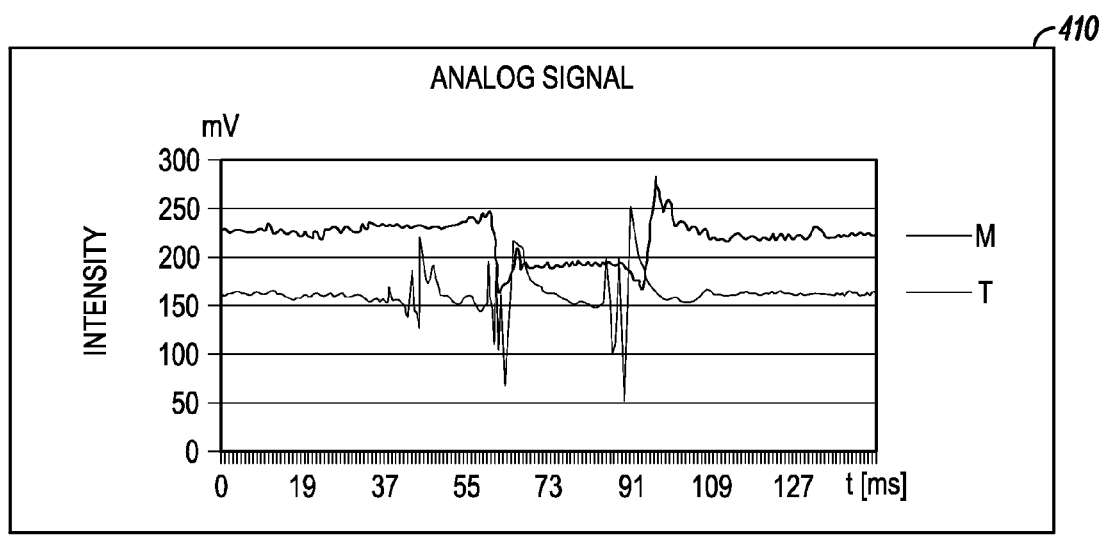
FIG. 4 illustrates a motion based signal and a tactile based signal received overlapped to each other.
Figure 5:
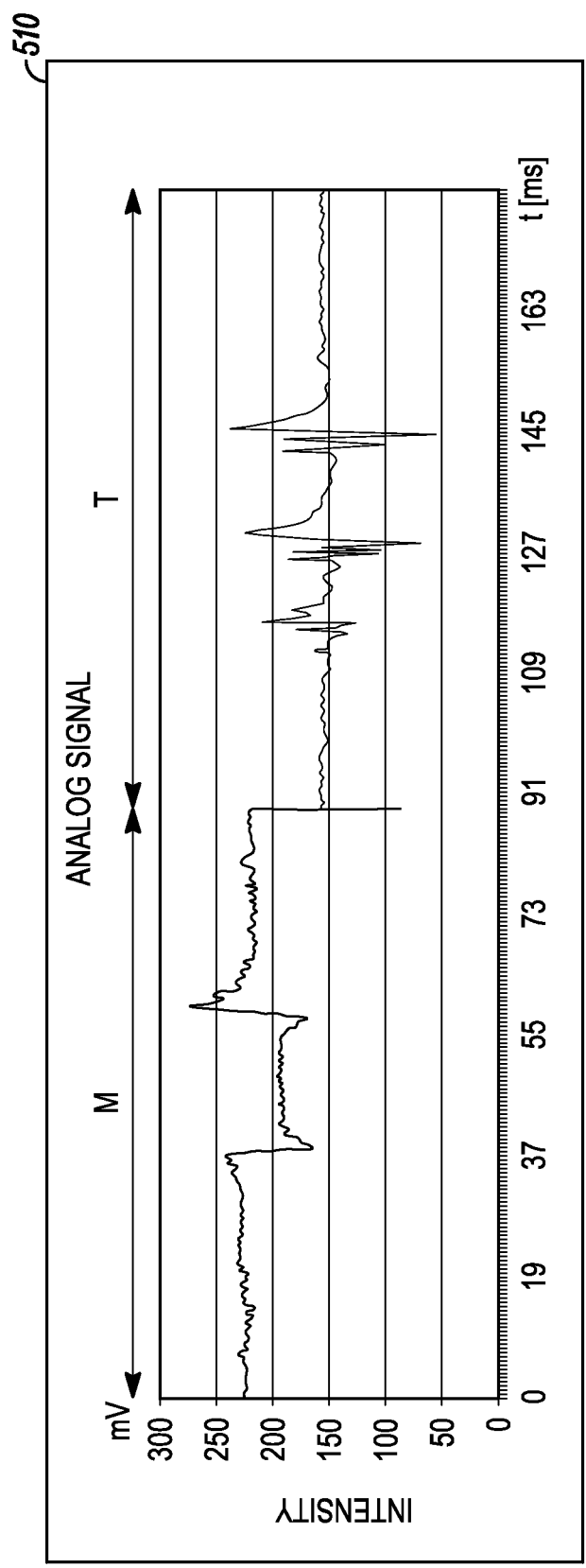
FIG. 5 illustrates a motion based signal and a tactile based signal received in a sequence.

In one embodiment, receiving the second training signal in conjunction with the first training signal means to receive the second training signal concurrently with the first training signal as shown in FIG. 4. In this example, the first training signal and the second training signal are overlapped to each other. The term overlapped does not necessarily mean that the first training signal and the second training signal coincide with each other. In another embodiment, receiving the second training signal in conjunction with the first training signal means to receive the second training signal following the first training signal as shown in FIG. 5. In this example, the first training signal and the second training signal are sequential to each other.

In an embodiment, the first training signal and the second training signal are each from a common mode of input. For example, both the first training signal and the second training signal is a motion based signal.

In an embodiment, the first feature sequence characterizes the first training signal as a function of time and the second feature sequence characterizes the second feature sequence as a function of time. The purpose of converting a training signal which is in e.g., analog form to a sequence of features is to produce a set of reduced yet salient features that represent the training signal. The redundant or non-discriminative information may then be discarded. In an embodiment, the multimodal tag can be modeled as Hidden Markov Models (HMMs). A Hidden Markov model is used to determine hidden parameters from observable parameters. The extracted hidden parameters can then be used to perform further analysis, for example for pattern matching applications. In the present disclosure pattern matching can be done on voice based input signals, image based input signals and/or input signals of other modalities.

Although receiving the first training signal and receiving the second training signal as shown in FIGS. 4 and 5 are described above, an embodiment may include an additional training signal or additional training signals. Thus, the mention of first and second is used solely for ease in description and is not limiting. An embodiment of the present invention may include three, four, or further additional training signals to create a multimodal tag. Thus using any number of training signals in creating a multimodal tag is contemplated in an embodiment.

At step 140, a function is associated with the created multimodal tag. The function is an operation to be performed on the communication device. Examples of the operation to be performed on the communication device include activating/deactivating an application, navigating through a menu, managing information etc.

Once the communication device is trained to associate the created multimodal tag to a function as discussed in the steps above, the multimodal tag may be invoked to perform a function associated with the multimodal tag. Invoking the multimodal tag is done by repeating the user actions which were performed while providing training signals. The repeated user actions now provide a plurality of input signals. Each of the input signals may be one of an audio signal, a tactile based signal, a motion based signal, or a gesture based signal. It is then determined whether the received plurality of input signals correspond to one of a plurality of multimodal tags. The plurality of multimodal tags refers to the created multimodal tags which have been trained to associate with a specific function when invoked. Any pattern matching technique can be used for determining if the plurality of input signals corresponds to a multimodal tag. If it is determined that the plurality of input signals correspond to one of the plurality of multimodal tags, a function associated with one of the plurality of multimodal tags is performed.

In an embodiment the pattern matching technique is performed on the first feature sequence and the first training signal of each multimodal tag in the plurality of multimodal tags. Similarly, the pattern matching technique is performed on the second feature sequence and the second training signal of each multimodal tag in the plurality of multimodal tags. In an alternate embodiment, the pattern matching technique is performed on the combination of the first feature sequence and the second feature sequence and a first two modalities of each multimodal tag in the plurality of multimodal tags.

In an embodiment the pattern matching is performed with HMM model or Dynamical Time Warping (DTW). Dynamic Time Warping is an algorithm for measuring similarity between two sequences which may vary in time or speed. For instance, similarities in speech patterns would be detected, for example if during training a multimodal tag the person was speaking slowly and if during invoking the multimodal tag the person is speaking fast using DTW. DTW can be been applied to video, audio, and graphics, indeed, any data which can be turned into a linear representation can be analyzed with DTW.

In an embodiment, receiving the second training signal in conjunction with the first training signal means receiving a motion based signal in conjunction with an audio signal. In an example, a movement of the communication device in combination with voice activity is registered as a multimodal tag for performing a function e.g., activating a speech window. The audio signal may be analyzed using speech analysis techniques that generate features of the audio signal such as Mel Frequency Cepstral Coefficients (MFCC). Once the communication device is trained for this multimodal tag, the next time the user wants to activate a speech recognition window, the user simply has to bring the communication device near his mouth and utter a command. This saves the user from navigating a menu in order to activate a speech recognition window for invoking a voice tag or from using a push-to-talk button. The first training signal and the second training signal may be in any user preferred order.

In another embodiment, receiving the second training signal in conjunction with the first training signal means receiving a tactile signal in conjunction with an audio signal. In an example, a touch based input or a stylus based input in combination with a voice pattern is registered as a multimodal tag for performing a function e.g., entering a signature. Once the communication device is trained for this multimodal tag, the next time the user wants to put his signature on an e-mail, the user simply has to write his signature and utter a secret code for enabling the signature. The first training signal and the second training signal may be in any user preferred order.

In yet another embodiment, receiving the second training signal in conjunction with the first training signal means receiving a gesture based signal in conjunction with an audio signal. In an example, a specific motion of a user captured by a camera in the communication device in combination with voice activity is registered as a multimodal tag for performing a function e.g., reading certain messages. Once the communication device is trained for this multimodal tag, the next time the user wants to read a message from a particular sender, the user simply has to make a gesture of his choice e.g. hand movement and then utter the sender's name. All the messages sent by this particular sender may then be displayed. The first training signal and the second training signal may be in any user preferred order.

In yet another embodiment, receiving the second training signal in conjunction with the first training signal means receiving a motion based signal in conjunction with a tactile based signal. In an example, a specific velocity, acceleration, direction, trajectory, gravity, or rotation etc. of the communication device in combination with a touch based input or a key press is registered as a multimodal tag for performing a function e.g., call 911. Once the communication device is trained for this multimodal tag, when the user has an emergency or is in a hostile environment, the user simply has to shake the communication device vigorously and press any key in order to notify helpline. Such a multimodal tag saves precious time for the victim and at the same time keeps the intruders unaware of a call made to the helpline. The first training signal and the second training signal may be in any user preferred order.

In yet another embodiment, receiving the second training signal in conjunction with the first training signal means receiving a motion based signal in conjunction with a gesture based signal. In an example, a specific velocity, acceleration, direction, trajectory, gravity, or rotation etc. of the communication device in combination with a specific motion by the user is registered as a multimodal tag for performing a function e.g., tracing palm lines. Once the communication device is trained for this multimodal tag, the next time the user wants to access stored personal information, the user simply has to move the communication device over the lines of his palm in a certain order. Such a multimodal tag helps the user to secure personal information. The first training signal and the second training signal may be in any user preferred order.

In yet another embodiment, receiving the second training signal in conjunction with the first training signal means receiving a gesture based signal in conjunction with tactile based signal. In an example, a specific motion of a user captured by a camera in the communication device in combination with a touch based input or a key press is registered as a multimodal tag for performing a function e.g., calculation. Once the communication device is trained for this multimodal tag, the next time the user wants to perform a calculation, the user simply has to make a gesture of his choice e.g. hand movement to trace an arithmetic symbol (+, _, /, *, %) and then press a numeral to perform a calculation on the numeral. The first training signal and the second training signal may be in any user preferred order.

Figure 6:
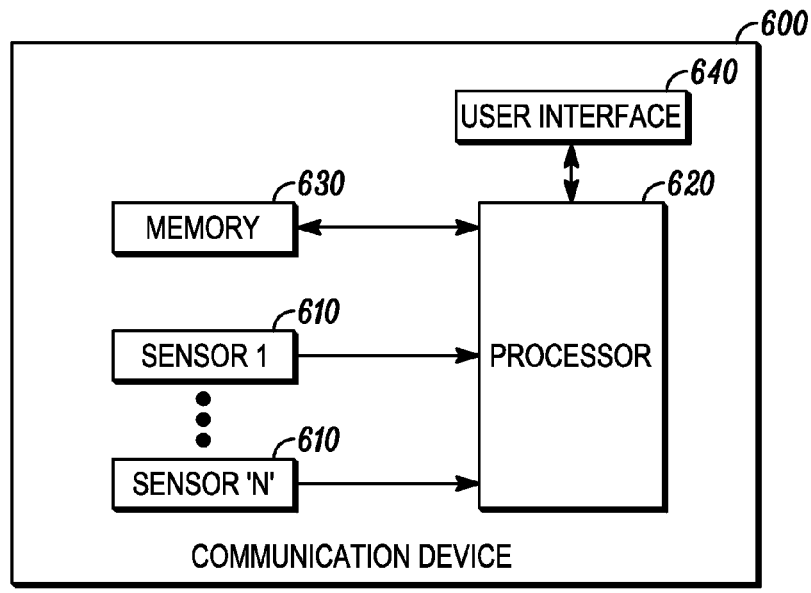
FIG. 6 is a block diagram illustrating an apparatus for enabling multimodal tags in a communication device.

FIG. 6 is a block diagram illustrating an apparatus for enabling multimodal tags in a communication device. The apparatus may be implemented in an electronic device, e.g., communication device 600. The apparatus includes a plurality of sensors 610, a processor 620, memory 630, and a user interface 640. The plurality of sensors 610 is used for detecting training signals which are being input to the communication device 600 through user interface 640. The user interface 640 is a graphical input and a graphical output of the communication device 600. Examples of sensors 610 are a touch sensor, a pressure sensor, an acoustic sensor (microphone), an optical sensor (camera), an acceleration sensor etc. In an embodiment, a first sensor detects a first training signal and a second sensor detects a second training signal.

Figure 7:
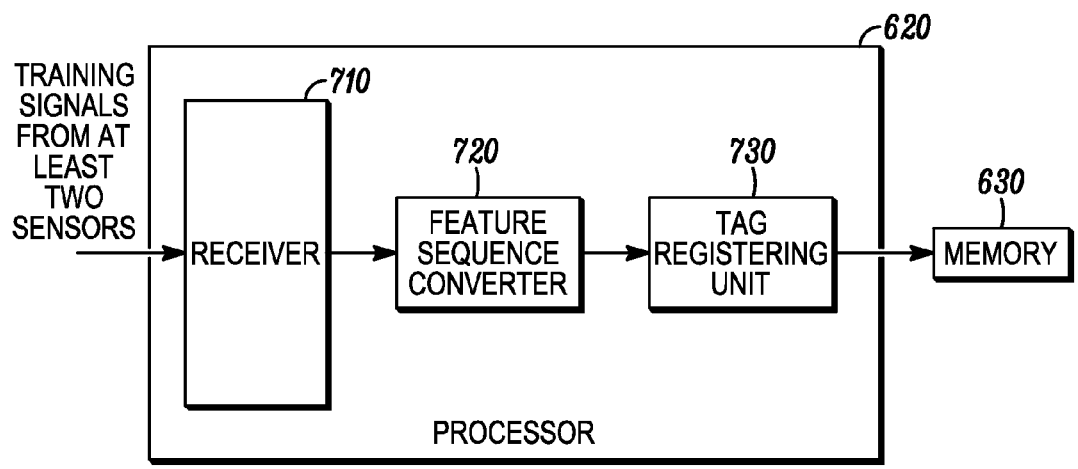
FIG. 7 is a block diagram illustrating elements of a processor in accordance with an embodiment of the present invention.

FIG. 7 is a block diagram illustrating elements of a processor 620 (FIG. 6) in accordance with an embodiment of the present invention. The processor 620 coupled to the plurality of sensors 610 includes a receiver 710, a feature sequence converter 720 and a tag registering unit 730. The receiver 710 receives the first training signal and the second training signal either overlapped to each other or sequential to each other. The feature sequence converter 720 coupled to the receiver 710 converts the first training signal to a first training signal feature sequence. Similarly, the feature sequence converter 720 converts the second training signal to a second training signal feature sequence.

In an embodiment the first training signal and the second training signal are combined using any fusion techniques prior to conversion to a training signal feature sequence. In another embodiment, the first training signal feature sequence and the second training signal feature sequence are combined using any one of the fusion techniques after the first training signal and the second training signal are converted to a feature sequence.

Once the first training signal and the second training signal are each converted to the first training signal feature sequence and the second training signal feature sequence, the tag registering unit 730 registers the first training signal feature sequence and the second training signal feature sequence as a multimodal tag. Alternatively, the tag registering unit 730 registers the combination of the first training signal and the second training signal.

The multimodal tag created as above is then associated with a function to be invoked in order to perform a function. The multimodal tag with the associated function is stored then in the memory 630 coupled to the processor 620.

Figure 8:
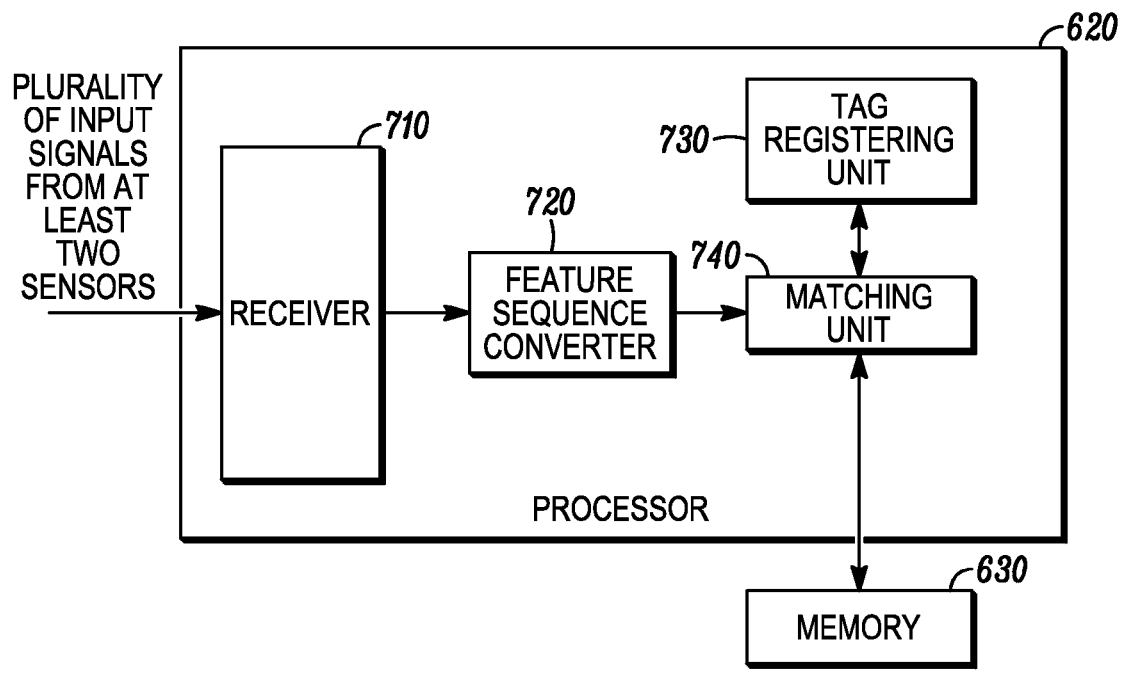
FIG. 8 is a block diagram illustrating elements of a processor in accordance with another embodiment of the present invention.

The processor of FIG. 7 as described above is used for training the communication device to associate a function with a multimodal tag. The processor 620 as shown in FIG. 8 further functions to invoke a multimodal tag in order to perform a function associated with the multimodal tag. In order to invoke a multimodal tag which is already stored in the memory 630 of the communication device 600, the first sensor coupled to the processor 620 detects a first input signal and the second sensor coupled to the processor 620 detects a second input signal. The first input signal and the second input signal may each be an audio signal, a tactile based signal, a motion based signal, or a gesture based signal. The feature sequence converter 720 converts the first input signal to a first input signal feature sequence and the second input signal to a second input signal feature sequence. The processor 620 includes a matching unit 740 to determine whether the first input signal feature sequence and the second input signal feature sequence corresponds to a multimodal tag stored in the memory 630. When the first input feature sequence and the second input feature sequence correspond to a multimodal tag the function associated with the multimodal tag is performed.

In an example embodiment, the first training signal is a motion based signal and the second training signal is a voice based signal. The choice of training signals is based on a user defined expression of input modalities for a multimodal tag. The user defined expression of input modalities are user memorable and is therefore easily repeatable by the user. The choice is also influenced by the capabilities of the communication device. A combination of the motion based training signal and the voice based training signal is stored as a multimodal tag by the tag registering unit 730. The communication device 600 is then trained in a manner as earlier discussed to associate a function with the multimodal tag. The function is, for example, to activate a speech window in the communication device 600. The activated speech recognition window will then be ready to receive and recognize a voice tag.

The next time the user wants to control the communication device 600 using voice tags, the user simply has to repeat the expression of input modalities used during training. Accordingly, the user has to input a motion signal followed by a voice command. As an example, the user takes the communication device near his ear and utters the command "call home." The matching unit 740 determines whether this expression of input modalities matches any of the multimodal tags stored in the memory 630 of the communication device 600. A match is found by the matching unit 740 and the processor 620 performs the function of activating the speech window. The user may now control the communication device based on voice tags.

In an embodiment, a multimodal tag is invoked based on a time window. The time window sets a maximum time during which the communication device will be looking for input signals (user actions). In an example, while training, the communication device is trained to store the features of a first training signal provided for a length of time T1 (e.g. 3 seconds) and the features of a second training signal provided for a length of time T2 (e.g. 2 seconds) as a multimodal tag. While invoking the multimodal tag, the first input signal has to be provided within 3 seconds after which the communication device stops looking for a first input signal and starts looking for a second input signal. The second input signal then has to be provided within 2 seconds. The definition of such timings may be predetermined, user selectable, or user settable.

In case of plurality of multimodal tags, a determination as to what should be the time window within which a user action is expected to occur is made based on a classification of various multimodal tags stored in the memory 630. For example, if the first input signal is a tactile based signal, then the classified list of multimodal tags which are trained to receive a tactile based signal as a first input signal is obtained. A maximum time limit T1 is determined for the tactile based signal from the list. Once the maximum time limit for the tactile based signal expires, the communication device starts looking for the second input signal. Similarly, for example, if the second input signal is a voice based signal, then the list of multimodal tags having tactile based signal as the first input signal and voice based signal as the second input signal is obtained. A maximum time limit T2 is determined for the voice based signal from the list. T1 would be the maximum length of time taken by any given tactile based signal in the list and T2 would be the maximum length of time taken by any given voice based signal in the list. In an embodiment, after T2 a time-out occurs and the user is prompted to repeat the user actions or quit. In another embodiment, the time window is closed once the received input signals match a multimodal tag and a match confidence exceeds a threshold.

The present disclosure provides the user a natural and intuitive user interface with the communication device. Such a user interface allows the user to train and enable multimodal tags in the communication device, where the multimodal tags represent the user's preferred expression of interaction. The user's preferred expression of interaction is either a combination of modalities or through unique interaction events such as a personalized physical hand gesture or combinations thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, by an electronic device, one or more first user inputs indicative of a first selection of a first input modality for a multimodal tag and a second input modality for the multimodal tag, wherein the first and second input modalities are selected from a set of input modalities comprising at least three different types of input modalities;
   detecting, with the first input modality of the electronic device, a first training signal;
   detecting, with the second input modality of the electronic device, a second training signal;
   creating a multimodal tag by at least discarding redundant or non-discriminative information associated with each of the first and second training signals and producing a training signal feature sequence that defines one or more salient features of both the first and the second training signals as a function of time;
   receiving at least one second user input indicative of a second selection of a function from a plurality of selectable functions; and
   associating the function with the multimodal tag.

2. The method of claim 1, further comprising:
   receiving a plurality of input signals; and
   in response to determining that the plurality of input signals correspond to the multimodal tag performing the function associated with the multimodal tag.

3. The method of claim 2, wherein at least one of the plurality of input signals includes a tactile sensor based signal.

4. The method of claim 2, wherein determining whether the received plurality of input signals correspond to the multimodal tag is done using a pattern matching technique.

5. The method of claim 4, wherein the pattern matching technique is performed on a first feature sequence and a second feature sequence, wherein the first feature sequence characterizes the first input signal as a function of time and the second feature sequence characterizes the second input signal as a function of time.

6. The method of claim 1, wherein the second training signal is a motion signal detected by a motion and the first training signal is an audio signal detected by an audio sensor.

7. The method of claim 6, further comprising: detecting the first training signal by at least analyzing the audio signal using speech analysis techniques.

8. The method of claim 1, wherein the second training signal is tactile signal detected by a tactile sensor and the first training signal is an audio signal detected by an audio sensor.

9. The method of claim 8, wherein the tactile signal is one of a touch based input, a key press input, or a stylus input.

10. The method of claim 1, further comprising detecting at least a third training signal, wherein creating the multimodal tag comprises combining the first, second, and third training signals into the training signal feature sequence.

11. The method of claim 1, wherein registering the training signal feature sequence comprises storing the training signal feature sequence as the multimodal tag.

12. The method of claim 1, wherein the second training signal is a motion based signal detected by a motion sensor and the first training signal is a tactile signal detected by a tactile sensor.

13. The method of claim 1, wherein at least one of the first training signal and the second training signal is based on at least one of velocity, acceleration, direction, trajectory, gravity, or rotation detected by a motion sensor.

14. The method of claim 1, wherein the second training signal is a motion based signal and the first training signal is a gesture based signal.

15. The method of claim 1, wherein the second training signal is a gesture based signal and the first training signal is a tactile sensor based signal.

16. The method of claim 1, wherein creating the multimodal tag further comprises combining the first and second training signals into the training signal feature sequence based on a temporal order at which the first training signal and the second training signal are detected.

17. The method of claim 1, wherein the first input signal is a motion based signal indicative of a shaking motion, the second input signal is a tactile based signal indicative of a key press, and the function is dialing a an emergency response service.

18. An electronic device comprising:
   a first sensor configured as a first input modality for detecting a first training signal associated with a multimodal tag;
   a second sensor configured as a second input modality for detecting a second training signal associated with a multimodal tag;
   a third sensor configured as a third input modality for detecting a third training signal associated with a multimodal tag;
   a memory for storing registered multimodal tags and associated functions; and
   a processor operably coupled to the first sensor, the second sensor, and the third sensor, wherein the processor is configured to:
      receive one or more first user inputs indicative of a first selection of the first input modality, the second input modality, and the third input modality;
      receive the first training signal, the second training signal, and the third training signal;
      receive at least one second user input indicative of a second selection of a function from a plurality of selectable functions;
      discard redundant or non-discriminative information associated with each of the first, second, and third training signals;
      produce a training signal feature sequence that defines one or more salient features of a combination of the first, second, and third training signals as a function of time; and
      register the training signal feature sequence as a multimodal tag by at least storing the user selected function in association with the multimodal tag.

19. The electronic device of claim 18, wherein producing the training signal feature sequence comprises combining the first, and second training signals into the training signal feature sequence based on a temporal order at which the first, and second training signals are received.

20. The electronic device of claim 18, wherein one of the first and second sensors are motion based sensors for detecting motion of the electronic device and the third sensor is a tactile based sensor for detecting tactile input associated with the electronic device.

21. A method comprising:
   receiving, by an electronic device, one or more first user inputs indicative of:
      a first selection of at least a first input modality for a multimodal tag,
      a second input modality for the multimodal tag, and
      a third input modality for the multimodal tag;
   detecting, with the first input modality of the electronic device, a first training signal;
   detecting, with the second input modality of the electronic device, a second training signal;
   detecting, with the third input modality of the electronic device, a third training signal;
   discarding redundant or non-discriminative information associated with each of the first, second, and third training signals;
   creating a multimodal tag by at least combining the first, second, and third training signals into one or more training signal feature sequences that define one or more salient features of a combination of the first, second, and third training signals as a function of time;
   receiving at least one second user input indicative of a second selection of a function from a plurality of selectable functions;
   and associating the function with the multimodal tag.

* * * * *